United States Patent [19]

Welsh et al.

[11] 4,380,601
[45] Apr. 19, 1983

[54] THERMOSETTING CATONIC ACRYLIC LATICES AND THEIR USE IN COATING COMPOSITIONS

[75] Inventors: David A. Welsh, Monroeville; Rostyslaw Dowbenko, Gibsonia; Suryya K. Das, Pittsburgh; Charles M. Kania, Tarentum; Roger M. Christenson, Gibsonia, all of Pa.

[73] Assignee: PPG Industries, Inc., Pittsburgh, Pa.

[21] Appl. No.: 305,585

[22] Filed: Sep. 25, 1981

[51] Int. Cl.³ .................... C08L 75/12; C08L 33/12
[52] U.S. Cl. ................................ 524/555; 428/425.8; 524/141; 524/145; 524/251; 524/512; 524/551; 524/560; 524/566; 524/591; 524/706; 524/707; 524/812
[58] Field of Search .............. 260/29.2 TN, 29.6 NR, 260/29.6 MP; 524/555, 591, 560, 141, 145, 251, 566

[56] References Cited

U.S. PATENT DOCUMENTS

| | | | |
|---|---|---|---|
| 3,108,979 | 10/1963 | Le Fevre et al. | 260/29.6 |
| 3,399,159 | 8/1968 | Samour | 260/29.6 |
| 3,532,658 | 10/1970 | Gintz | 260/29.6 |
| 3,547,950 | 12/1970 | Gander | 260/33.2 |
| 3,799,902 | 3/1974 | Anderson | 260/29.6 NR |
| 3,817,896 | 6/1974 | Bergmeister et al. | 260/29.6 R |
| 3,830,769 | 8/1974 | Ray-Chaudhuri et al. | 260/29.6 R |
| 3,892,703 | 7/1975 | Burke, Jr. | 260/29.6 R |
| 3,897,381 | 7/1975 | Tugukuni et al. | 260/29.2 TN |
| 3,901,857 | 8/1975 | Sackman et al. | 260/79.3 M |
| 3,941,727 | 3/1976 | Timmerman et al. | 260/8 |
| 4,001,159 | 1/1977 | Imai et al. | 260/29.6 TA |
| 4,008,247 | 2/1977 | Tucker | 260/308 B |
| 4,012,353 | 3/1977 | Chasin et al. | 260/29.6 NR |
| 4,064,091 | 12/1977 | Samour et al. | 260/29.6 HN |
| 4,108,817 | 8/1978 | Lochel, Jr. | 260/29.6 E |
| 4,130,523 | 12/1978 | Hoy et al. | 260/29.6 R |
| 4,132,686 | 1/1979 | Toyoshima et al. | 260/21 |
| 4,138,446 | 2/1979 | Kawakami et al. | 260/875 |
| 4,164,489 | 8/1979 | Daniels et al. | 260/29.6 R |
| 4,178,400 | 12/1979 | Lochel, Jr. | 427/435 |
| 4,180,519 | 12/1979 | Neel et al. | 260/459 A |
| 4,195,147 | 3/1980 | Sekmakas et al. | 526/312 |
| 4,207,405 | 6/1980 | Masler et al. | 525/328 |
| 4,224,415 | 9/1980 | Meitzner et al. | 521/38 |

*Primary Examiner*—Theodore E. Pertilla
*Attorney, Agent, or Firm*—Godfried R. Akorli; William J. Uhl

[57] ABSTRACT

A cationic thermosetting latex, coating compositions prepared therefrom, and the process for providing a protective coating are disclosed. The thermosetting latex comprises a blocked isocyanate curing agent and a cationic acrylic latex which is prepared by copolymerizing ethylenically unsaturated monomers, at least one of which contains an active hydrogen group, in an acidic medium in the presence of a cationic surfactant, of which the gegen-ion is derived from certain phosphorous-containing acids. Such latices, when formulated into coating compositions, provide corrosion-resistant coatings.

5 Claims, No Drawings

THERMOSETTING CATONIC ACRYLIC LATICES AND THEIR USE IN COATING COMPOSITIONS

BACKGROUND OF THE INVENTION

1. Field of the Invention

The present invention relates to thermosetting cationic latices, coating compositions prepared therefrom and a process for providing protective coatings for substrates, using said coating compositions.

2. Brief Description of the Prior Art

Cationic latices are known in the art and their method of preparation involving free radical emulsion polymerization of monomers in water, in the presence of cationic surfactants, is also known. The free radical emulsion polymerization procedure generally results in high molecular weight polymeric products which are normally in the range of 100,000 to several million. In this molecular weight range, the latices possess good mechanical properties. It has, however, been found that the latices leave something to be desired as to film properties relating to protective durability, i.e., the ability of coatings to maintain their integrity against chemicals, weathering, and the like.

In areas such as paper and textile manufacture where protective durability is not an essential service condition, cationic latices in their thermoplastic form have found a ready application primarily due to their inherent adhesion to anionic substrates. In areas such as protective coatings manufacture, where protective durability, particularly weathering, is an essential service condition, the cationic latices in their thermoplastic form are less desirable. In order to prepare good coatings, particularly protective coatings, with properties of outdoor durability, it is desirable to use thermosetting compositions. Coating compositions comprising thermosetting latices are, moreover, advantaged in that their application avoids problems such as air pollution, fire hazards and other problems which attend solvent-based coating compositions. The art-known thermosetting latices of commercial significance are basically anionic, and not cationic.

In developing the present invention, it has been found that there are a number of attendant problems that might have, in the past, hindered the development of cationic thermosetting latices of commercial significance. In the synthesis of substantially coagulum-free and stable cationic latices, strong acids such as HCl, HBr and the like have been used, to provide surfactant gegen-ions. It is believed that certain acids adversely affect some of the properties of the resultant cationic latices. It has, for example, been found that isocyanate curing agents, when formulated with the art-known cationic latices, impart ineffective cure, at ordinary cure temperatures.

In order to prepare effective thermosetting cationic latices, particularly those which will be useful as protective coatings especially in industrial applications, the above problems will have to be reduced or preferably avoided. Unfortunately, the art-known thermosetting cationic latices are, by and large, still attended by the aforesaid problems. Seemingly, the prior art has failed to discover the source of the aforesaid problem and/or to provide solutions therefor.

Co-filed application Ser. No. 305,590, filed Sept. 25, 1981 has disclosed the discovery of the source of the problem and the solution therefor. The thermosetting latices and the coatings described in that application are advantageously used on a variety of substrates. On ferrous metal substrates, however, the thermosetting latices, and compositions thereof, described therein tend to be corrosive as is manifested by flash rusting of the coated substrates. It is, therefore, desirable to provide thermosetting cationic latices, and compositions thereof, which can be applied to ferrous metal substrates to form corrosion-resistant coatings. This invention provides such latices and coatings prepared therefrom.

SUMMARY OF THE INVENTION

In accordance with the foregoing, the present invention encompasses a stable thermosetting cationic acrylic latex composition, comprising a blocked isocyanate curing agent and a cationic acrylic latex; the cationic acrylic latex being prepared by a process which comprises copolymerizing ethylenically unsaturated monomers, at least one of which contains an active hydrogen group, in an acidic medium in the presence of a cationic surfactant which has a gegen-ion derived from an acid selected from the group consisting of phosphoric acid, phosphorous acid, hypophosphorous acid and alkyl or aryl hydrogen phosphate.

Thermosetting coating compositions prepared from the above-described latices, articles coated therewith and the process for providing protective coatings for substrates, are also encompassed by this invention.

The thermosetting coating compositions of this invention have been found to have good substrate adhesion; more significantly, they cure very effectively. The cured films have been found to be very desirable; they display excellent properties of adhesion, smoothness, gloss retention, non-chalking, and corrosion, chemical and solvent resistance.

In a preferred embodiment, the instant latices comprise amino groups. Coating compositions of the amino group-containing latices have been found to display, in addition to the above, properties of mildew resistance and oxidative stability. In this context, the characterization of the latices, and the compositions thereof, as "amino group-containing" denotes that the polymer of the latices contains an amino group either as an integral part of it, or as otherwise present in its matrix. The former is illustrated by copolymerization of amino group-containing monomers, and the latter by, say, the use of an amino group-containing reagent, such as a surfactant which will co-cure with the polymer.

DETAILED DESCRIPTION OF THE INVENTION

The thermosetting cationic acrylic latex of this invention is prepared by free radical polymerization in an aqueous medium of ethylenically unsaturated monomers in the presence of a cationic surfactant. As is set forth more fully herein, the present invention is characterized by a select group of surfactants which are used during the polymerization of the monomers. It is a distinct feature of this invention that the group of acids from which the surfactant-gegen ions are derived are such as do not inhibit cure, and very significantly are not corrosive to metal substrates, particularly ferrous metal substrates. When the instant thermosetting cationic latex and coatings prepared therefrom are applied to substrates and cured, the coated substrates thus obtained are corrosion resistant. Additionally, acidic volatiles which are characteristically released during the curing process are not, in this instance, prone to causing corrosion of metal substrates to which they are exposed.

The polymerizable monomers are selected from the group consisting of an active hydrogen group-containing monomer and one or more other monomers different from the above.

The active hydrogen group can be a hydroxyl, amino, amido, or thiol group or mixtures thereof. They are incorporated into the polymer, during the preparation thereof, by copolymerizing ethylenically unsaturated monomers containing said active hydrogen groups.

Representative of the active hydrogen group-containing monomers are the hydroxyl group-containing monomers such as hydroxyalkyl acrylates and methacrylates. Preferably, the hydroxyalkyl group contains from about 2 to 4 carbon atoms. Examples thereof are hydroxyethyl acrylate, hydroxyethyl methacrylate, hydroxypropyl acrylate and hydroxypropyl methacrylate.

Examples of the amino group-containing monomer are the same as described hereinafter.

Examples of vinyl monomers containing amido groups are acrylamide, methacrylamide, ethacrylamide, alpha-chloro acrylamide, vinyl acetamide, N-methyl acrylamide, N-ethyl acrylamide and N-methyl methacrylamide.

The vinyl monomers containing the active hydrogens can be used in amounts of 1 to 30, preferably 1 to 10 percent by weight based on total weight of the monomer charge.

Examples of other ethylenically unsaturated monomers which are generally copolymerized with the above monomers are esters of unsaturated organic acids. These monomers can constitute from about 30 to 90, preferably from 40 to 80 percent of the total monomer charge. Representative of said monomers are alkyl acrylates and methacrylates containing from about 1 to 18 carbon atoms in the alkyl group.

The cationic latex can contain a hard polymer segment derived from an alkyl methacrylate containing from 1 to 3 carbon atoms in the alkyl group such as methyl methacrylate and ethyl methacrylate. Also, the cationic latex can contain a soft polymer segment obtained from the use of an alkyl methacrylate containing from 4 to 12 carbon atoms in the alkyl group, for example, butyl methacrylate and hexyl methacrylate, or an alkyl acrylate containing from 1 to 8 carbon atoms in the alkyl group, for example, butyl acrylate and 2-ethylhexyl acrylate. Mixtures of alkyl methacrylates containing from 4 to 12 carbon atoms in the alkyl group and alkyl acrylates containing from 1 to 8 carbon atoms in the alkyl group can also be used.

Another type of ethylenically unsaturated monomer which can be used in preparing the cationic latex constitutes copolymerizable monomeric materials such as styrene, alpha-methyl styrene, alpha-chlorostyrene, allyl chloride and acrylonitrile. This type of unsaturated monomeric materials will constitute about 0 to 60, preferably 0 to 40 percent by weight based on the total weight of the monomer charge.

The cationic latex may optionally contain carboxylic acid moieties which are introduced into the polymer from the use of an alpha, beta-ethylenically unsaturated carboxylic acid which is copolymerizable with the other monomers. Examples of unsaturated carboxylic acids are acrylic acid and methacrylic acid. Examples of other less preferred unsaturated acids are crotonic acid, maleic acid or its anhydride, furmaric acid or itaconic acid. Usually, when these latter-mentioned acids are used, they are used in combination with acrylic or methacrylic acids. It is, however, preferred that the polymer contain little or no carboxyl groups.

Amino group-containing monomers are particularly useful in the preparation of the preferred embodiments of the invention, with the advantages set forth above. The amino group can be primary, secondary, tertiary or quaternary. Representative of the amino group-containing monomers are aminoalkyl acrylates or methacrylates. Preferably, the aminoalkyl group contains from about 1 to 6 carbon atoms in the alkyl radical. Examples thereof are appropriate salts of aminoethyl, aminopropyl and aminohexyl acrylates or methacrylates, N,N-dialkylaminoalkyl acrylates or methacrylates. Also useful are vinyl monocyclic or bicyclic amino compounds including those which have a five or six-membered heterocyclic compound with a nitrogen heteroatom; acrylamide-amino modified monomers and quaternary ammonium group-containing monomers.

The amino group-containing monomers can be present for the polymerization in amounts preferably from about 0.5 to 10, more preferably from about 1 to 3, and most preferably from about 1.5 to 2.5 percent based on total weight of the monomer charge.

In accordance with this invention, the surfactants which are useful herein can be selected from the group consisting of amino salts, preferably fatty amine salts of phosphoric acid, phosphorous acid, hypophosphorous acid and alkyl or aryl hydrogen phosphate; the phosphorous and hypophosphorous acids are preferred.

The surfactants can be of an external or internal type, or both. By external surfactant is meant those which do not constitute an integral part of the resulting acrylic latex polymer backbone. In contrast, by internal surfactants are meant those which do constitute an integral part of the resulting acrylic latex polymer backbone; they are realized through a copolymerization of monomers which are capable of salt formation. It is desired to point out that when the internal surfactants are employed, the salt formation can occur before, during or after polymerization of the monomer.

Typically, the amount of surfactant required varies primarily with the concentration of the monomers to be handled and, to an extent, with the choice of surfactant, monomers, and proportions of the monomers. Usually, the amount of external surfactant is between 0 to 10 percent by weight of the mixture of monomers and is preferably 0.1 to 5 percent by weight. If the latex is to contain none or relatively low amounts of the external surfactant, the amount of the polymerizable monomer giving rise to the internal emulsifier will have to be increased compensatorily.

The free radical polymerization initiator is a water-soluble type. Examples include peroxides such as cumene hydroperoxide, t-butyl hydroperoxide; and redox catalysts which are preferred, especially preferred is the catalyst of erythorbic acid with $H_2O_2$ or t-butyl hydroperoxide. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

The cationic latex can be prepared by emulsion polymerization techniques well known in the art. Examples of suitable techniques involve the pre-emulsification technique and the seeding technique. In the pre-emulsification technique, a small amount of water is present in the polymerization vessel together with a polymerization initiator and part of the surfactant emulsifying agent. The monomer charge is emulsified in a larger amount of water and surfactant and is continuously added to the reaction vessel under polymerizing conditions. Alternately, the total amount of water may be present in the reaction vessel and the monomer or monomers added in bulk form. If all the surfactant is not present initially in the reaction vessel, it can be added simultaneously with the monomer addition.

In the seeding technique, a small amount of the monomer charge is added to the reaction vessel along with all or part of the polymerization initiator and all or part of the surfactant and polymerized to form a seed latex. After formation of the seed latex, the remaining polymerization ingredients are added in a continuous manner to the reaction vessel under polymerizing conditions to form the final polymer emulsion.

Generally, the solids content of the cationic latex prepared by the above method will be from about 35 to 65 percent and usually within the range of about 40 to 60 percent. The molecular weight of the latex is in the range of about 100,000 to 10 million, as determined by gel permeation chromatography. Preferably, the molecular weight is about 250,000 or higher.

The aqueous latex of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The cationic latex prepared by the process described above can be mixed with a minor amount, that is, up to 20 percent by weight based on total latex weight, of thickening agents, stabilizers, anti-foaming agents, preservatives, pigments, pigment extenders and plasticizers, if desired.

The cationic latex of the present invention is made thermosetting in nature by the presence of curing agents such as blocked isocyanates or aminoplasts. The curing agents can be an integral part of the polymer or they can be external to the polymer.

The external isocyanate curing agents can be the same in nature and method of preparation as in U.S. Pat. No. 3,984,299, column 1, line 57, through column 3, line 5, which is herein incorporated by reference.

The thermosetting compositions prepared as described above can be employed in coating compositions which can be either clear or pigmented. Pigments which may be used can be any of the conventional types with the proviso that they do not adversely affect the desirable properties of the paint; the settling property of the paint, for example, would have to be taken into account.

The pigment content of the paint is usually expressed as the pigment-to-binder weight ratio. In the practice of the present invention, the pigment-to-binder weight ratios are as high as 2:1, for most pigmented coatings, are within the range of 0.5 to 1:1.

The cationic latex of the present invention, including pigmented latex, is stable, that is, it is non-sedimenting when stored at 10° to 30° C. If any sediment does form, it is the type which can be redispersed with mild agitation.

Coating compositions as described above are particularly useful for coil coating applications. Coil coating involves the application of the coating composition to a continuous strip of a metallic substrate, usually aluminum or steel. The metal is of relatively light gauge and comes to the coating operation in the form of coils from which it is unwound and continuously coated. After coating, the coil passes into a baking or curing oven where it is cured at relatively high temperatures for a relatively short period of time. The coated article is then passed to further operations where it is fabricated into desirable shapes such as for home and industrial siding as well as automotive and appliance parts.

Although particularly useful in coil coating applications, the thermosetting compositions of the cationic latex can be applied to any solid substrate such as glass, porcelain or metals other than steel and aluminum such as copper, brass, and nickel.

Having generally described the features of this invention, the following examples are given to illustrate more fully to those skilled in the art, the practice of this invention without intending any limitations thereby. All parts and percentages are by weight unless otherwise indicated.

EXAMPLES

In the preparation of the latices of the present invention, there was, generally, adopted the following experimental approach.

Seeding

The seeding technique described hereinbefore was adopted in the preparation of the latices of the present invention. The seeding process entails a preparation of monomer pre-emulsion, as follows: A surfactant mix comprising deionized water, fatty amine, non-ionic surfactant(s) and phosphoric acid or the equivalent in accordance with the invention was introduced into a 5-liter pre-emulsification tank at ambient temperature under nitrogen blanket with a good agitation. A monomer charge was then added to the tank over a period of one hour, yielding a monomer pre-emulsion. A portion of the monomer pre-emulsion was used with a portion of the initiator to start a seed charge.

Manner of Addition of the Residual Pre-Emulsion and Initiator Charge

It was found that the manner of addition of residual monomer pre-emulsion and residual initiator, i.e., the portion outside what was used in the preparation of the seed, affected the quality of the resultant latex. The following method of addition was adopted in the preparation of the latices. The residual pre-emulsion was added to the reactor over a period of about 3 to 3.25 hours. The rate of addition of the residual initiator was adjusted so that it was all added to the reactor charge in about 0.5 hour after the monomer pre-emulsion was completely added.

The following are specific illustrations of the process for preparing the acrylic cationic latices of the invention.

EXAMPLE 1

The following were used in the preparation of the cationic latex.

| Reactor Charge | |
|---|---|
| Ingredients | Parts by Weight |
| Deionized water | 960.0 |
| Phosphoric acid | 1.0 |
| ARMEEN DM12D[1] | 0.75 |

[1]Dimethyl lauryl amine, a product of Armak Industrial Chemicals Division.

| Feed A | |
|---|---|
| Ingredient | Parts by Weight |
| Hydrogen peroxide (30% aqueous) | 16.67 |

| Feed B | |
|---|---|
| Ingredients | Parts by Weight |
| Erythorbic acid | 10.0 |
| Deionized water | 90.0 |

| Surfactant Mix | |
|---|---|
| Ingredients | Parts by Weight |
| Deionized water | 650 |
| ARMEEN DM12D | 6.25 |
| IGEPAL CO-730[2] | 32.6 |
| Phosphoric acid | 2.6 |

[2]Ethylene oxide adduct of nonyl phenol, a product of GAF Corp.

| Monomer Charge | |
|---|---|
| Ingredients | Parts by Weight |
| Methyl methacrylate | 750 |
| Butyl acrylate | 750 |
| Hydroxypropyl methacrylate | 67.93 |

The reactor charge was heated to 80° C. followed by the addition of a seed comprising 50 grams of monomer pre-emulsion, prepared as stated in the above general description portion of the Examples, 5 grams of Feed B and all of Feed A to initiate the seed. The resulting mixture was held at this temperature for 20 minutes to allow the seed charge to polymerize completely. This is followed by the addition of the rest of Feed B and the rest of the monomer pre-emulsion in the manner described hereinabove. At the completion of the addition of the feed B, there is obtained a cationic latex which is rinsed with about 100 grams of water as described above. The resultant latex was cooled to a temperature of about 35°-40° C. and filtered.

EXAMPLE 2

The following example also shows the preparation of the acrylic latices of the present invention. The following were used in the preparation.

| Reactor Charge | |
|---|---|
| Ingredients | Parts by Weight |
| Deionized water | 960.0 |
| Phosphoric acid | 9.4 |
| ARMEEN DM12D | 0.75 |

| Feed A | |
|---|---|
| Ingredient | Parts by Weight |
| Hydrogen peroxide (30% aqueous) | 16.67 |

| Feed B | |
|---|---|
| Ingredients | Parts by Weight |
| Erythorbic acid | 10.0 |
| Deionized water | 90.0 |

| Surfactant Mix | |
|---|---|
| Ingredients | Parts by Weight |
| Deionized water | 650.0 |
| ARMEEN DM12D | 6.25 |
| IGEPAL CO-730 | 32.0 |
| Phosphoric acid | 2.6 |

| Monomer Charge | |
|---|---|
| Ingredients | Parts by Weight |
| Methyl methacrylate | 850.0 |
| Butyl acrylate | 650.0 |
| Hydroxypropyl methacrylate (94%) | 67.73 |
| Dimethylaminoethyl methacrylate | 31.92 |

The method of preparation is essentially the same as that described in Example 1 and the general experimental approach described hereinabove. The resultant cationic latex had a resin solids content of 47.1 percent, a pH of 3.05, a Brookfield viscosity of 33 centipoises measured at 50 rpm's with a No. 1 spindle at 20° C.

EXAMPLE 3

The following example further shows the preparation of the acrylic latices of the present invention. The following were used in the preparation.

| Reactor Charge | |
|---|---|
| Ingredients | Parts by Weight |
| Deionized water | 960.0 |
| ARMEEN DM12D | 0.75 |
| Hypophosphorous acid (50% aqueous) | 40.0 |

| Feed A | |
|---|---|
| Ingredient | Parts by Weight |
| Erythorbic acid | 10.0 |

| Feed B | |
|---|---|
| Ingredients | Parts by Weight |
| t-butyl hydroperoxide (70%) | 14.3 |
| Deionized water | 90.3 |

| Surfactant Mix | |
|---|---|
| Ingredients | Parts by Weight |
| Deionized water | 650.0 |
| ARMEEN DM12D | 6.25 |
| IGEPAL CO-730 | 32.0 |
| Hypophosphorous acid (50% aqueous) | 8.0 |

| Monomer Charge | |
|---|---|
| Ingredients | Parts by Weight |
| Methyl methacrylate | 750.0 |
| Butyl acrylate | 750.0 |
| Hydroxypropyl methacrylate (94% active) | 67.95 |
| Dimethylaminoethyl methacrylate | 31.92 |

The reactor charge was heated up to 70° C., followed by the addition of a seed charge comprising 50 grams of the pre-emulsion monomer, prepared as described above, Feed A and about 5 grams of Feed B to initiate a seed charge. The reaction mixture was held at this temperature for 20 minutes to allow the seed charge to polymerize completely. The rest of the monomer pre-emulsion and the rest of Feed B is added in the manner described in the general experimental approach section described hereinabove. After a 1.5-hour hold at a temperature of 80° C., at the completion of the addition of the rest of Feed B, the resultant latex was rinsed with 100 grams of deionized water, cooled to 35°-40° C. and filtered. The resultant latex had a resin solids content of about 47.3 percent, a pH of 1.9 and a Brookfield viscosity of 27.0 centipoises measured at 20° C.

EXAMPLE 4

This example illustrates a thermosetting paint composition prepared from the instant latices, and the use thereof. The preparation is as follows:

A cationic latex was prepared with the following:

Reactor Charge

| Ingredients | Parts by Weight |
|---|---|
| Deionized water | 1123.5 |
| 21.4% of Monomer Charge | 160.23 |

Feed A

| Ingredients | Parts by Weight |
|---|---|
| Erythorbic acid | 5.0 |
| Deionized water | 95.0 |

Feed B

| Ingredient | Parts by Weight |
|---|---|
| Hydrogen peroxide (30% aqueous) | 3.33 |
| Deionized water | 96.67 |

Surfactant Mix

| Ingredients | Parts by Weight |
|---|---|
| Deionized water | 707.6 |
| ARMEEN DM12D | 7.45 |
| PLURONIC F68[1] | 14.89 |
| Phosphoric acid | 19.41 |

[1] A non-ionic surfactant, available from BASF Wyandotte Corp.

Monomer Charge

| Ingredients | Parts by Weight |
|---|---|
| Methyl methacrylate | 476.6 |
| Butyl acrylate | 700.0 |
| Hydroxypropyl methacrylate (94%) | 59.6 |
| Dimethylaminoethyl methacrylate | 29.79 |
| Styrene | 223.40 |

The method of preparation is essentially the same as that described in Example 1 and the general experimental approach described hereinabove. The resultant cationic latex was substantially free of coagulum and had a resin solids content of 40.0 percent, a pH of 2.68, a Brookfield viscosity of 26 centipoises measured at 50 rpm's with a No. 1 spindle at 20° C.

A pigment paste was prepared with the following:

| Ingredients | Parts by Weight (Grams) |
|---|---|
| Acrylic cationic grind vehicle[1] | 60 |
| Diethylene glycol monobutylether | 40.0 |
| Lactic acid (88% aqueous) | 9.5 |
| Deionized water | 97.2 |
| DREWMULSE L-475[2] | 6.17 |
| Shephard Black | 86.64 |
| Titanium dioxide | 10.50 |
| Red iron oxide | 76.13 |
| Chrome green | 10.50 |

[1] This comprises an amine-containing, water-reducible acrylic polymer.
[2] A defoamer, available from Drew Company.

The above ingredients were ground in a Cowles mixer to a Hegman No. 7.5 grind.

The paint was prepared using the above paste and the following ingredients, as listed below:

| Ingredients | Parts by Weight (Grams) |
|---|---|
| Pigment paste (from above) | 49.13 |
| Crosslinker[3] (modified with lactic acid | 5.88 |
| Latex, described above | 101.90 |
| Diethylene glycol monobutylether | 8.51 |
| Dibutyltin diacetate (2% active) | 0.8 |

[3] A triisocyanate curing agent (derived from isophorone diisocyanate, blocked with dibutylamine and dimethylethanolamine).

To obtain the paint, the above ingredients were thoroughly mixed as follows: A premix of the paste and crosslinker was added to the latex, under agitation, followed by the addition of diethylene glycol monobutylether.

The above paint was applied on panels of primed aluminum substrate (Alcoa Bonderite 721) by a drawdown method and then baked at a temperature of 435° F. (224° C.) for 50 seconds. The oven temperature was 500° F. (260° C.). The panels were quenched in deionized water after baking. There were obtained films of 0.7 mils thickness, having excellent substrate adhesion, smoothness, gloss, water resistivity, chemical and solvent resistance and exterior durability.

EXAMPLE 5

The following were used in the preparation of the cationic latex.

Reactor Charge

| Ingredients | Parts by Weight |
|---|---|
| Deionized water | 2000.0 |
| Phosphoric acid | 23.0 |

Feed A

| Ingredients | Parts by Weight |
|---|---|
| Erythorbic acid | 10.0 |
| Deionized water | 90.0 |

Feed B

| Ingredients | Parts by Weight |
|---|---|
| t-butyl hydroperoxide (70% aqueous) | 10.0 |
| Deionized water | 90.0 |

Monomer Charge

| Ingredients | Parts by Weight |
|---|---|
| Methyl methacrylate | 700 |
| Butyl acrylate | 700 |
| Hydroxypropyl methacrylate | 140 |
| Dimethylaminoethyl methacrylate | 31.5 |
| ARMEEN DM12D | 12.0 |

Seed Charge

| Ingredient | Parts by Weight |
|---|---|
| 3.2% Monomer Charge | 50 |

The reactor charge was heated to 70° C., followed by the addition of the seed charge. Five minutes thereafter, 10 grams of Feed B were added, and the addition of Feed A was commenced and continued at a constant rate over 5 hours. Thirty minutes thereafter, the addition of the rest of the monomer charge and the rest of Feed B was commenced and continued at a constant rate, for 4½ hours. At the end of this addition, the resultant mixture was held for 2 hours, at 70° C., then cooled and filtered. Resulting was a latex having a resin solids content of 42.7 percent and a Brookfield viscosity of 19.2 centipoises measured at 50 rpm's with a No. 1 spindle, at 22° C.

COMPARATIVE EXAMPLE

This example is intended to show the advantageous corrosion-resistant feature of the instant latices and the compositions thereof when contrasted with latices prepared with surfactants derived from methane-sulfonic acid and the like, on ferrous metal substrates.

Illustrative of the latex prepared with a surfactant derived from methanesulfonic acid is the following:

The following were used in the preparation:

| Reactor Charge | |
| --- | --- |
| Ingredients | Parts by Weight |
| Deionized water | 2000.0 |
| Methanesulfonic acid | 23.0 |
| ARMEEN DM12D | 2.0 |

| Feed A | |
| --- | --- |
| Ingredients | Parts by Weight |
| Erythorbic acid | 15 |
| Deionized water | 85 |

| Feed B | |
| --- | --- |
| Ingredients | Parts by Weight |
| t-butyl hydroperoxide (70% aqueous) | 15 |
| Deionized water | 85 |

| Monomer Charge | |
| --- | --- |
| Ingredients | Parts by Weight |
| Methyl methacrylate | 700 |
| Butyl acrylate | 700 |
| Hydroxypropyl methacrylate | 140 |
| Dimethylaminoethyl methacrylate | 31.5 |
| ARMEEN DM12D | 10.0 |

| Seed Charge | |
| --- | --- |
| Ingredient | Parts by Weight |
| 3.2% Monomer Charge | 50 |

The method of preparation was essentially the same as described in Example 5. Resulting was a latex having a resin solids content of 42.7 percent and a Brookfield viscosity of 21.8 centipoises measured with a No. 1 spindle, at 22° C.

COMPARATIVE TESTING—RESULT

The latices of Example 5 and the Comparative Example were drawn down on cold rolled steel panels and air dried for 48 hours.

On a scale of 1 to 10, the latex of Example 5 showed no flash rusting, i.e., a scale reading of 0. In contrast, the latex of the Comparative Example showed severe flash rusting, at a scale reading of 9.

We claim:

1. A stable thermosetting cationic acrylic latex composition, comprising a blocked isocyanate curing agent and a cationic acrylic latex; the cationic acrylic latex being prepared by a process which comprises copolymerizing ethylenically unsaturated monomers, at least one of which contains an active hydrogen group, in an acidic medium in the presence of water, a polymerization initiator and a cationic surfactant which has a gegen-ion derived from an acid selected from the group consisting of phosphoric acid, phosphorous acid, hypophosphorous and alkyl or aryl hydrogen phosphate.

2. A thermosetting latex of claim 1, wherein the acid is hypophosphorous acid.

3. A thermosetting latex of claim 1, wherein the latex contains an amino group.

4. A thermosetting latex of claim 3, wherein the amino group is derived from an ethylenically unsaturated monomer containing an amino group.

5. A coating composition comprising the acrylic latex composition as in claim 1.

* * * * *